(No Model.)
W. VOSS.
TRUCK FOR VEHICLES.
No. 515,099. Patented Feb. 20, 1894.
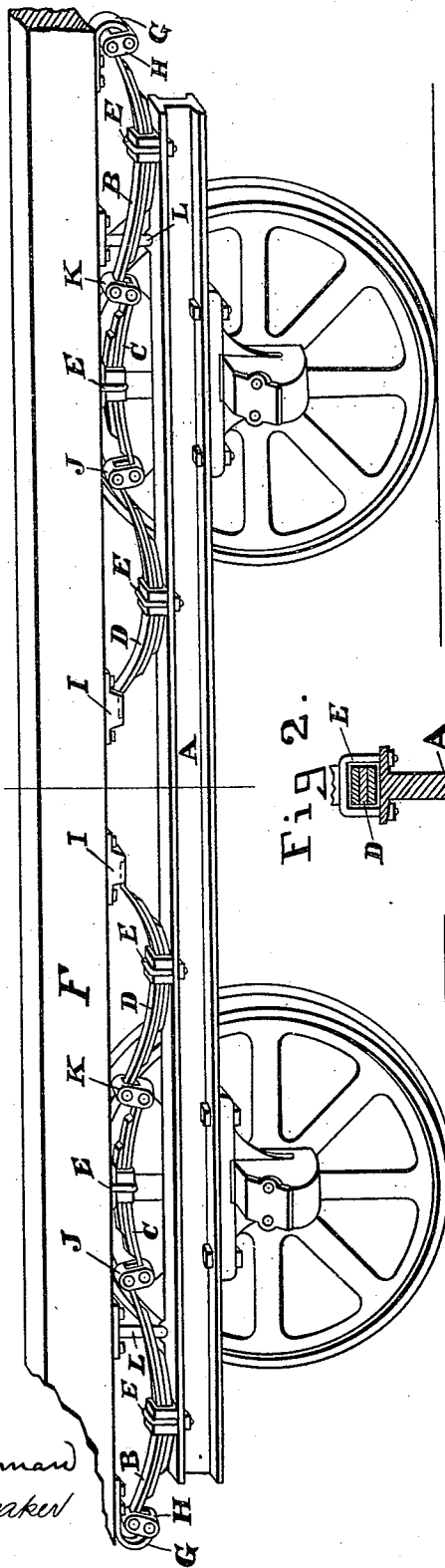
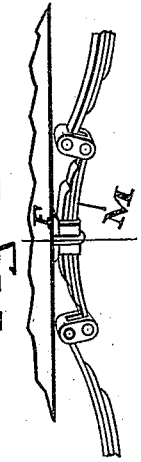
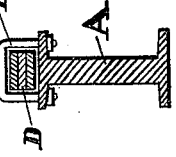
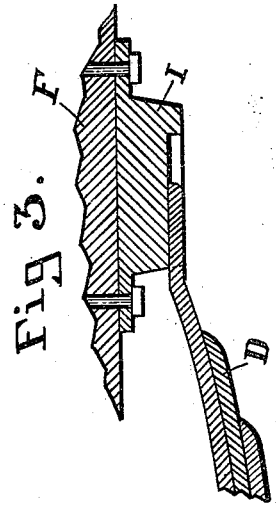
Attest.
E. B. Lehman
Chas V. Hunsaker
Inventor.
William Voss
by J. Kirby
his Atty

United States Patent Office.

WILLIAM VOSS, OF DAYTON, OHIO, ASSIGNOR TO THE BARNEY & SMITH CAR COMPANY, OF SAME PLACE.

TRUCK FOR VEHICLES.

SPECIFICATION forming part of Letters Patent No. 515,099, dated February 20, 1894.

Application filed November 14, 1893. Serial No. 490,942. (No model.)

*To all whom it may concern:*

Be it known that I, WILLIAM VOSS, a citizen of the United States, residing at Dayton, in the county of Montgomery and State of Ohio, have invented certain new and useful Improvements in Trucks for Vehicles, of which the following is a specification, reference being had therein to the accompanying drawings.

My invention relates to an improvement in trucks for vehicles more particularly to the arrangement of springs in street car trucks.

The object of the invention is to provide a car truck with an arrangement of springs that will better equalize the weight of the car body, to prevent as much as possible a tilting motion of the latter, impart an easy movement to the car and simplify the general construction of such trucks.

With these objects in view my invention consists broadly of one or more series of springs, commonly termed half-elliptic, preferably located above the side bars of the truck frame upon which the car body is mounted.

The invention further consists in the various novel details of construction hereinafter fully described in the specification, illustrated in the drawings and more particularly pointed out in the claim.

In the accompanying drawings forming part of this specification, Figure 1 represents a partial side elevation of a street car embodying my improvement. Fig. 2 is an enlarged cross section through the side bar of the frame and one of the springs showing the manner in which the latter is screwed to the frame. Fig. 3 is an enlarged cross section of one of the socket bearings carrying the free end of one of the springs, and Fig. 4 represents a modification of my invention as shown in Fig. 1.

Like letters of reference indicate corresponding parts in the several figures.

In the drawings I have illustrated only such parts of a complete car as is necessary to show wherein my invention lies and the same may be carried into effect in other ways without in the least departing from the spirit thereof.

A represents one of the side bars of the truck frame which may be mounted upon the axles in any well known manner.

B, C, D are springs—usually termed half-elliptic—the springs B, and D are rigidly secured to the frame A preferably by clamps E which girdle the springs and which may be secured to the frame by any desired means, spring C being secured to the under side of the sill F of the car body.

G represents a curved support plate, one end of which is longer than the other and is also secured to the under side of the sill F, the shorter end being connected with the spring B by connecting link H.

I represents sockets which are also secured to the under side of sill F and whose functions are to carry the free ends of springs D, which ends are free to move in the said sockets as the springs contract and expand in accordance with the load variations of the car, one end of each of springs B and D is connected to spring C by links J, K, thus it will be seen that all the springs are free to yield to the fluctuation in load and otherwise of a car or other vehicle.

I have shown as best means of carrying out my invention two sets of springs, one set being located at each end of the truck, it being understood that the opposite side of the truck is similarly equipped. The springs may however all be connected in one continuous chain by employing another spring M at the center in lieu of sockets I and connecting its ends with the free ends of springs D by links similar to J, K, as shown in Fig. 4, and rigid levers may be substituted for either of the springs B, C, and D or any two of them, in which case the result will be to some extent the same, but experiments have demonstrated the arrangement shown in Fig. 1 to be preferable. It will be observed that clamps E are located to one side of the center of springs B and D while in springs C it is located at the center, which arrangement is employed in order to properly balance the springs, the usual guide pins L are employed to steady the body of the car on the truck and they form no part of my invention.

My improved truck, while designed more particularly for street car use, is equally well adapted to other forms of vehicles and while I have shown the improvement as applied to street cars I do not limit my invention to such form of vehicle. In practice it has been demonstrated to contribute largely to the comfort of passengers, particularly in that a car body when thus mounted rides more smoothly, the strains to which the body is subjected being evenly distributed from the fact that a load applied at any point is uniformly felt by each set of springs and the objectionable end tilting motion usually felt in other forms of trucks is by the described arrangement of springs greatly reduced.

Having thus fully described my invention, I claim—

In a car truck, one or more series of half-elliptic springs rigidly secured at or near their centers alternately to the car body and truck frame, the said springs being so linked together and their free ends so connected with the car body or truck frame as to permit all the springs to yield freely to the inclinations of the car body and truck, whereby the weight is practically uniformly distributed over all the springs, thereby imparting an easy movement to the car, and a uniform distribution of strains on the car body, substantially as described.

WILLIAM VOSS.

Witnesses:
C. U. RAYMOND,
G. M. WEAVER.